(12) United States Patent
Bradley et al.

(10) Patent No.: US 6,748,748 B2
(45) Date of Patent: Jun. 15, 2004

(54) HYDROGEN STORAGE AND SUPPLY SYSTEM

(75) Inventors: Keith Bradley, El Cerrito, CA (US); Jeff D. Wyatt, Berkeley, CA (US); Jean-Christophe P. Gabriel, Pinole, CA (US); George Gruner, Los Angeles, CA (US)

(73) Assignee: Nanomix, Inc., Emeryville, CA (US)

( * ) Notice: Subject to any disclaimer, the term of this patent is extended or adjusted under 35 U.S.C. 154(b) by 0 days.

(21) Appl. No.: 10/167,946

(22) Filed: Jun. 10, 2002

(65) Prior Publication Data

US 2003/0226365 A1 Dec. 11, 2003

(51) Int. Cl.$^7$ ................................................ F17C 11/00
(52) U.S. Cl. ..................................................... 62/46.1
(58) Field of Search ............................... 62/45.1, 46.1, 62/48.1, 440, 451; 423/248

(56) References Cited

U.S. PATENT DOCUMENTS

| | | | |
|---|---|---|---|
| 4,358,316 A | 11/1982 | Liu et al. | 75/123 |
| 4,446,101 A | 5/1984 | Bernauer et al. | 420/424 |
| 4,580,404 A | 4/1986 | Pez et al. | 62/55.5 |
| 4,716,736 A | 1/1988 | Schwarz | 62/48 |
| 4,960,450 A | 10/1990 | Schwarz et al. | 62/642 |
| 5,385,876 A | 1/1995 | Schwarz et al. | 502/80 |
| 5,653,951 A | 8/1997 | Rodriguez et al. | 423/439 |
| 5,698,140 A | 12/1997 | Lamb et al. | 252/502 |
| 5,787,605 A * | 8/1998 | Okui et al. | 314/448 |
| 6,159,538 A | 12/2000 | Rodriguez et al. | 427/213.31 |
| 6,168,694 B1 | 1/2001 | Huang et al. | 202/290.12 |
| 6,182,717 B1 | 2/2001 | Yamashita | 141/82 |
| 6,268,077 B1 | 7/2001 | Kelley et al. | 429/33 |
| 6,293,110 B1 | 9/2001 | Stetson et al. | 62/46.2 |
| 6,302,943 B1 | 10/2001 | Johnson et al. | 95/96 |
| 6,305,442 B1 | 10/2001 | Ovshinsky et al. | 141/231 |
| 6,318,453 B1 | 11/2001 | Ovshinsky et al. | 165/104.12 |
| 6,326,097 B1 | 12/2001 | Hockaday | 429/34 |
| 6,328,821 B1 | 12/2001 | Ovshinsky et al. | 148/420 |

OTHER PUBLICATIONS

Hynek, Fuller and Bentley, "Hydrogen Storage by Carbon Sorption," *Int. J. Hydrogen Energy*, vol. 22, No. 6, (1997) pp. 601–610.

* cited by examiner

*Primary Examiner*—Denise L. Esquivel
*Assistant Examiner*—Malik N. Drake
(74) *Attorney, Agent, or Firm*—O'Melveny & Myers LLP

(57) ABSTRACT

A hydrogen storage and supply apparatus is described. The apparatus has a container that includes a cold enclosure. A porous material capable of occluding hydrogen pervades the cold enclosure. The porous material contains a plurality of light elements including Be, B, C, N, O, F, Mg, P, S, Li, Na, Al, Si and Cl. The cold enclosure can have a temperature in a range between about 30K and 270K and can withstand pressures up to about 50 bara. The container can have a layered wall structure with at least two walls, and there can be a cavity between the walls, which can provide thermal insulation. A hydrogen-consuming system is described in which the hydrogen storage and supply apparatus is used to provide hydrogen to a hydrogen-fueled device. A hydrogen production and distribution system, which used the hydrogen storage and supply apparatuses is described. Methods of storing, supplying and using hydrogen are also described.

9 Claims, 9 Drawing Sheets

HYDROGEN STORAGE AND SUPPLY SYSTEM

BACKGROUND OF THE INVENTION

1. Field of the Invention

This invention relates generally to the storage of hydrogen in containers and, more specifically, to an apparatus and a method for a hydrogen storage system that contains porous materials that can adsorb or absorb hydrogen.

2. Description of the Related Art

There is great interest in hydrogen as a replacement for fossil fuels because of its very high energy density per unit weight, because it is readily available through the electrolysis of water, and because it is a virtually pollution-free energy source. Some major drawbacks to the use of hydrogen as fuel are that it is extremely volatile and that it is difficult to store.

In developing hydrogen fuel systems for the so-called hydrogen economy, a lot of attention has been focused on methods and systems for economical storage and distribution of quantities of hydrogen suitable for use as a fuel in micro-power plants, in vehicles and in personal electronics. There will be a need to store hydrogen as inventory at the point of production; there will be a need to store hydrogen for transport from producers to distributors; there will be a need to store hydrogen at the point of distribution; and there will be a neet to store hydrogen at the point of use. For all these storage applications, it will be necessary to store hydrogen safely in the smallest possible volumes. Certainly for vehicles and for personal electronics, it will also be necessary to store hydrogen at the lowest possible weight. At present, there are four major methods of hydrogen storage that are being discussed. Some are already in use; some are still in the testing stage.

One method is to use high pressure tanks to store hydrogen at pressures as high as 10,000 psi. One of the problems with this method is that highly-reactive hydrogen is a good diffuser, and even more so under high pressure. Many tank materials cannot stand up to hydrogen diffusion at high pressures for a long period of time. When lightweight storage is added to the requirements, it is not really possible to make a robust high-pressure storage tank for power applications.

Another hydrogen storage method involves using metal hydrides, such as magnesium-based alloys, to bind to hydrogen. Although this method does not require high pressure and can even work at room temperature, there are other drawbacks. The metal hydrides are generally heavier than the hydrogen gas by a factor of about 10. When hydrogen is released, some metal contamination goes with it, which is undesirable. Metal hydride storage is not very energy efficient. It can use up as much as half the energy of the stored hydrogen just to extract the hydrogen from the metal hydride. Metal hydride storage has been disclosed by Liu et al. in U.S. Pat. No. 4,358,316, by Bernauer et al. in U.S. Pat. No. 4,446,101, and by Ovshinsky et al. in U.S. Pat. No. 6,328,821.

Liquid hydrogen storage at cryogenic temperatures is being used in some applications. This method is rather cumbersome and unreliable as it requires using a second cryogenic liquid, such as liquid nitrogen, and it is necessary to maintain the temperature at 20K to avoid boil off of hydrogen.

Activated carbon has been used to store hydrogen at cryogenic temperatures and moderate pressures (50–70 atm), as has been described by Schearz in U.S. Pat. No. 4,716,736. Cryogenic storage in activated carbon can be done at a higher temperature (80K) than is required for liquid hydrogen storage. Hydrogen can bind to the surfaces in the activated carbon and can be released by increasing the temperature. Often activated carbon is not very pure, and contaminants are released with the hydrogen. Many researchers have found that it is difficult to get activated carbon to release all of its stored hydrogen. Problems cited with activated carbon include low weight percent storage capacity and maintaining cryogenic temperatures. Some of these problems have been discussed by Hynek et al. in "Hydrogen storage by carbon sorption," *Int. J. Hydrogen Energy*, Vol. 22, No. 6, pp.601–610, 1997.

Other materials for hydrogen storage that are being explored include carbon nanotubes and graphite fibers. These have been described by Rodriguez et al. in U.S. Pat. No. 5,653,951 and U.S. Pat. No. 6,159,538.

Clearly the requirements for hydrogen storage in the hydrogen economy have not been met. There is a need for a system that can store and supply significant quantities of hydrogen at higher temperatures and lower pressures than those used by the current methods.

SUMMARY OF THE INVENTION

In accordance with one embodiment of the present invention, a hydrogen storage and supply apparatus is provided. The apparatus has container that includes a cold enclosure. A porous material capable of occluding hydrogen pervades the cold enclosure. The porous material contains a plurality of light elements including Be, B, C, N, O, F, Mg, P, S, Li, Na, Al, Si and Cl. The cold enclosure may have a temperature in a range between about 30K and 270K, preferably between about 100K and 250K, and, more preferably, between about 150K and 220K. The container can withstand pressures up to about 50 bara, preferably, between about 2 bara and about 20 bar. The container may have a layered wall structure with at least two walls. There can be a cavity between the walls, which can provide thermal insulation. There may be at least one port in the container, which provides a channel for hydrogen flow into or out of the cold enclosure. The port may contain at least one valve to control the hydrogen flow. In some arrangements, there can be one or more hydrogen storage and supply apparatuses that are engaged with a coupling assembly through the ports on the containers. Hydrogen may be either provided to or withdrawn from the containers through the coupling assembly.

In accordance with another embodiment of the invention a hydrogen-consuming system is provided. The system has a container with a cold enclosure. A porous material capable of occluding hydrogen pervades the cold enclosure. The porous material contains a plurality of light elements including Be, B, C, N, O, F, Mg, P, S, Li, Na, Al, Si and Cl. On the container, there is at least one port that provides an outlet for hydrogen flow from the cold enclosure associated with the container. A hydrogen-fueled device is connected to the container at the port so that the device can receive hydrogen from the cold enclosure. In some arrangements, the containers are interchangeable. The hydrogen-fueled device may be a fuel cell. The hydrogen-consuming system may be a transportation vehicle, a household appliance, or an electronic appliance.

In another aspect of the invention, a hydrogen production and distribution system is provided. The system includes one or more hydrogen production facilities, a hydrogen distribution system that transfers hydrogen from the production facilities to points of hydrogen consumption. Hydrogen storage apparatuses, as described above, are used in any part of the hydrogen distribution system.

In other embodiments, methods for storing and supplying hydrogen are provided. The method involves providing at least one container having a cold enclosure and at least one port, and placing a porous material capable of occluding hydrogen in the cold enclosure. The material is as described above. Hydrogen is provided to the porous material in the cold enclosure. Hydrogen can be allowed to flow out from the cold enclosure through the port. A coupling assembly can engage one or more containers, and hydrogen can be provided to or withdrawn from the containers through the assembly.

In another aspect of the invention, a method for using hydrogen as fuel is provided. The method involves providing at least one container with a cold enclosure and porous material as described above. A channel for hydrogen flow out from and into the cold enclosure is provided by fitting the container with at least one port. Hydrogen is stored in the porous material in the cold enclosure. A hydrogen-fueled device is connected to the port on the container, and hydrogen is allowed to flow out from the cold enclosure to the hydrogen-fueled device. The hydrogen-fueled device may be a fuel cell and/or a component of a machine.

Further features and advantages of the present invention will become apparent to those of ordinary skill in the art in view of the detailed description of preferred embodiments below, when considered together with the attached drawings and Claims.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION OF THE PREFERRED EMBODIMENT

As discussed above, there is a need for a system that can store and supply significant quantities of hydrogen at higher temperatures and lower pressures than those used by the current methods. The aforementioned need is satisfied by the apparatuses and the methods disclosed in the embodiments of the present invention.

This and other advantages of the present invention will become more fully apparent from the following description taken in conjunction with the accompanying drawings, wherein like numerals refer to like parts throughout.

Figure 1A:
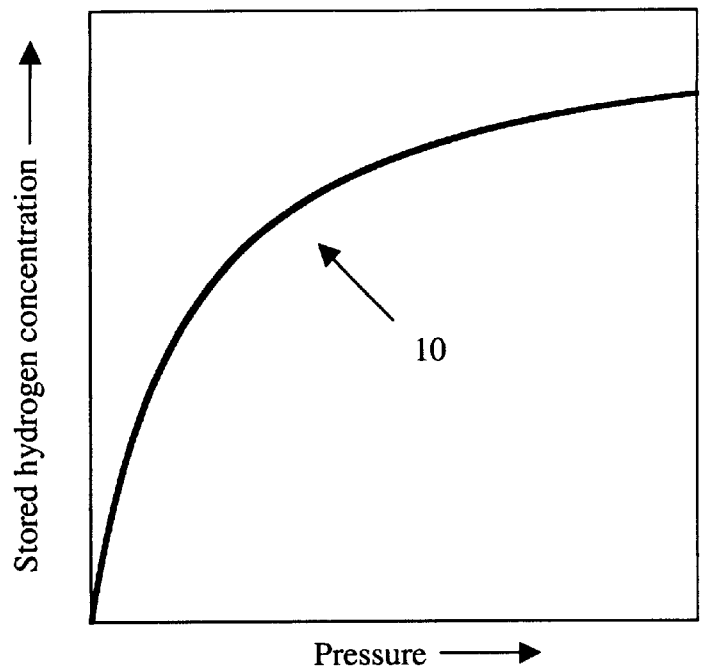
FIG. 1A is a plot of stored hydrogen as a function of pressure at constant temperature for a porous storage material.
Figure 1B:
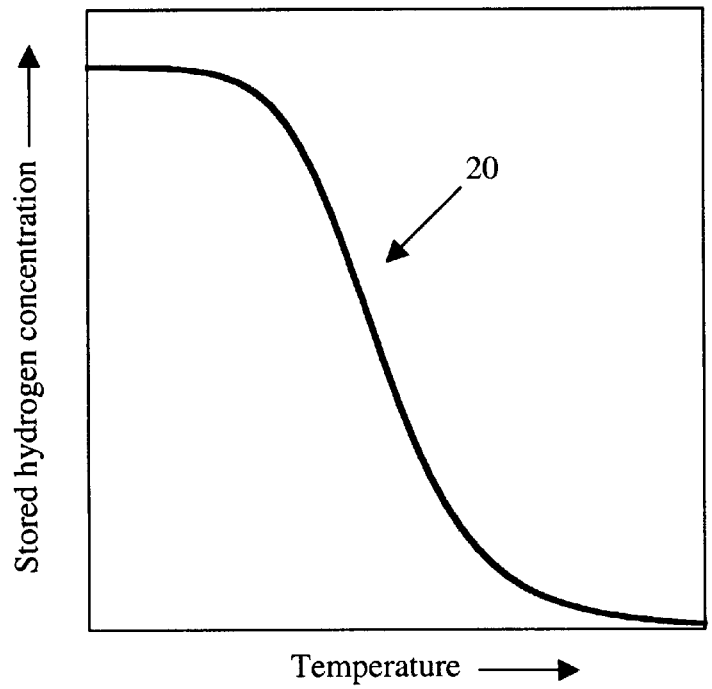
FIG. 1B is a plot of stored hydrogen as a function of temperature at constant pressure for a porous storage material.

FIGS. 1A and 1B are included for informational purposes, as they show some general hydrogen adsorption properties for porous materials. FIG. 1A is a plot of stored hydrogen as a function of pressure at constant temperature for a porous storage material. FIG. 1A shows that at a given temperature the amount of adsorbed hydrogen increases as the pressure of hydrogen increases along curve 20. This behavior is seen for temperatures above the liquefaction temperature of hydrogen. In general, the preferred embodiments of the present invention store hydrogen at temperatures well above its critical temperature, and even above the boiling point of nitrogen, which is 77K. FIG. 1B is a plot of stored hydrogen as a function of temperature at constant pressure for a porous storage material. FIG. 1B shows that for a given pressure the amount of adsorbed hydrogen decreases with increasing temperature along curve 20. As the porous material heats up, it adsorbs less hydrogen. This is a general behavior true for a wide range of pressures. In the preferred embodiments of the disclosed hydrogen storage and supply apparatus, the pressure used for hydrogen storage is significantly below the pressure of conventional hydrogen storage schemes, such as high pressure (350 bara) storage. The pressure of hydrogen inside the enclosure in a typical embodiment of the storage is below about 50 bara and preferably between about 2 bara and 20 bara.

Figure 2:
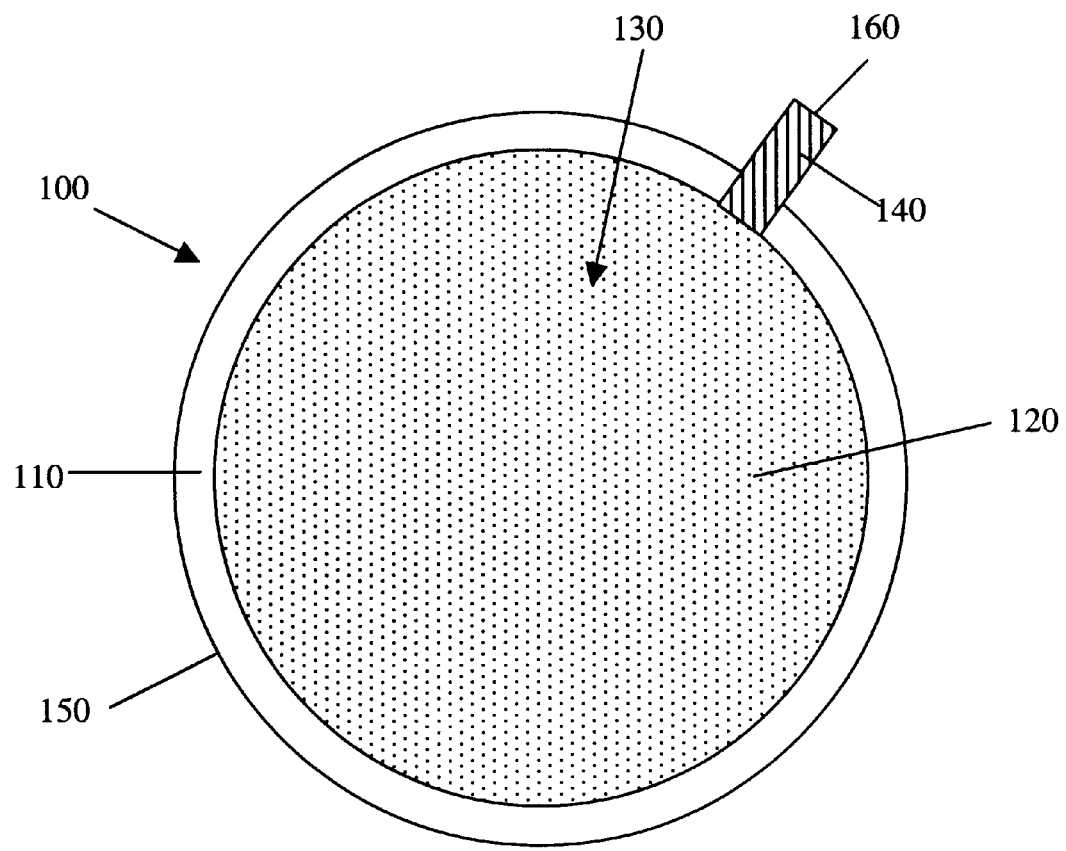
FIG. 2 is a schematic drawing of a hydrogen storage and supply apparatus, according to an embodiment of the invention.

FIG. 2 is a schematic drawing of a hydrogen storage and supply apparatus 100, according to an embodiment of the invention. A container 110 surrounds a cold enclosure 120. In this illustration, the container 110 is round, but any shape is possible. The shape of the container 110 can be chosen to fit the desired use. The container 110 can be made of any high strength material. Preferably, the container 110 is lightweight and has good thermal insulation properties. Examples of materials that can be used for the container 110 include high strength plastics, carbon composites and fiberglass. For the purposes of this disclosure, "cold" is understood to include any temperature in the range from approximately 30K to about 270K. The lower portion of this temperature range is also commonly referred to as "cryogenic," but it is understood that these temperatures are included in the term "cold" as used in this disclosure. The cold enclosure 120 can have a temperature in the range from about 30K to about 270K, preferably in the range from about 100K to about 250K, more preferably, in the range from about 150K to about 220K. In some arrangements, the cold enclosure 120 can withstand pressures up to about 50 bara, preferably between about 2 bara and 20 bara.

As shown in FIG. 2, the cold enclosure 120 contains porous material 130 that is capable of occluding, i.e., adsorbing or absorbing, hydrogen. For the purposes of this disclosure, a "porous material" is a material with a surface area greater than 200 m²/gm. Although the cold enclosure 120 in FIG. 2 is shown as completely filled with the porous material 130, this is only one of many possible arrangements consistent with the embodiments of the invention. In other arrangements, the cold enclosure 120 is only partially filled with the porous material 130, or the cold enclosure can contain only a small amount of the porous material 130. The porous material 130 contains a plurality of light elements, including Be, B, C, N, O, F, Mg, P, S, Li, Na, Al, Si and Cl. In some embodiments, the porous material 130 contains at least two light elements from those listed above, each of which constitutes at least 10 weight % of the porous material. In some embodiments, the porous material 130 contains at least two light elements from those listed above, each of which constitutes at least 15 weight % of the porous material. In some embodiments, the porous material 130 contains at least two light elements from those listed above, each of which constitutes at least 20 weight % of the porous material. Porous materials made from light elements can have advantages for hydrogen storage. The advantages include, but are not limited to, low mass, storing hydrogen at less cold (i.e., higher) temperatures, and the possibility of very pure material. In some embodiments, the porous material 130 can be a nanostructured material. Examples of nanostructured hydrogen storage material have been disclosed by Bradley et al. in U.S. patent application Ser. No. 10/020,392, "Hydrogen storage in nanostructures with physisorption" and by Kwon et al. in U.S. patent application Ser. No. 10/020,344 "Increasing hydrogen adsorption of nanostructured storage materials by modifying sp² covalent bonds," both of which are included by reference herein. The container 110 can have one port 140 as shown, or it can have more than one port 140. The one or more ports 140 provide channels for hydrogen flow into and out of the cold enclosure 120. The ports 140 can include valves (not shown) to control the hydrogen flow. For example, a first port 140 can be used to provide hydrogen to the cold enclosure 120, and a second port 140' (not shown) can be used to withdraw hydrogen from the cold enclosure 120. Although FIG. 2 shows the distal end 160 of the port 140 extending beyond the exterior surface 150 of the container 110, this is only one possible arrangement. The distal end 160 of the port 140 can be flush with the exterior surface 150 of the container 110, or the distal end 160 can be recessed with respect to the exterior surface 150, as long as the arrangement provides a channel for hydrogen flow into or out of the cold enclosure 120. The distal end 160 of the port can engage with fittings on outside elements (not shown). Outside elements can provide hydrogen to the cold enclosure 120 or withdraw hydrogen from the cold enclosure 120 through the one or more ports 140.

Figure 3A:
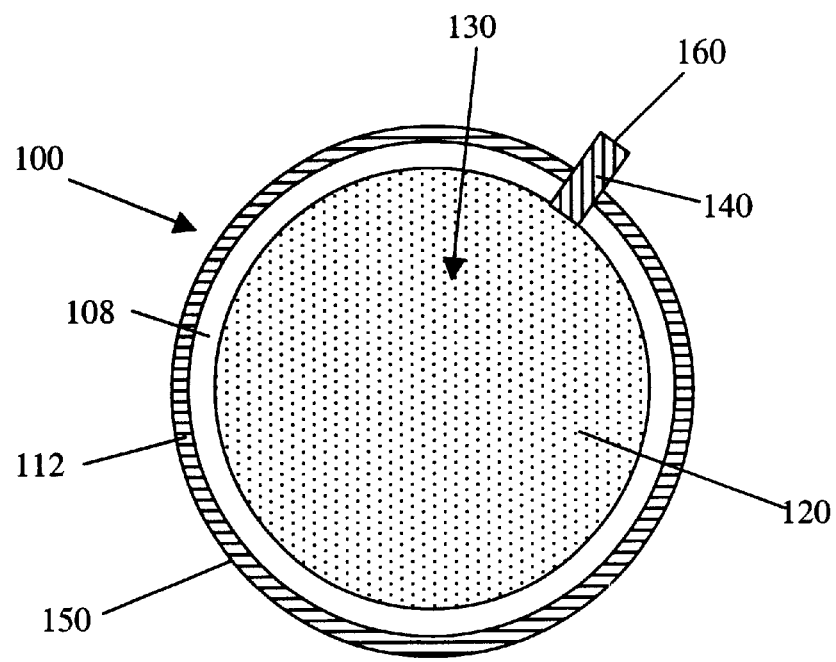
FIG. 3A is a schematic drawing of a hydrogen storage and supply apparatus that has a container with a two wall structure, according to an embodiment of the invention.
Figure 3B:
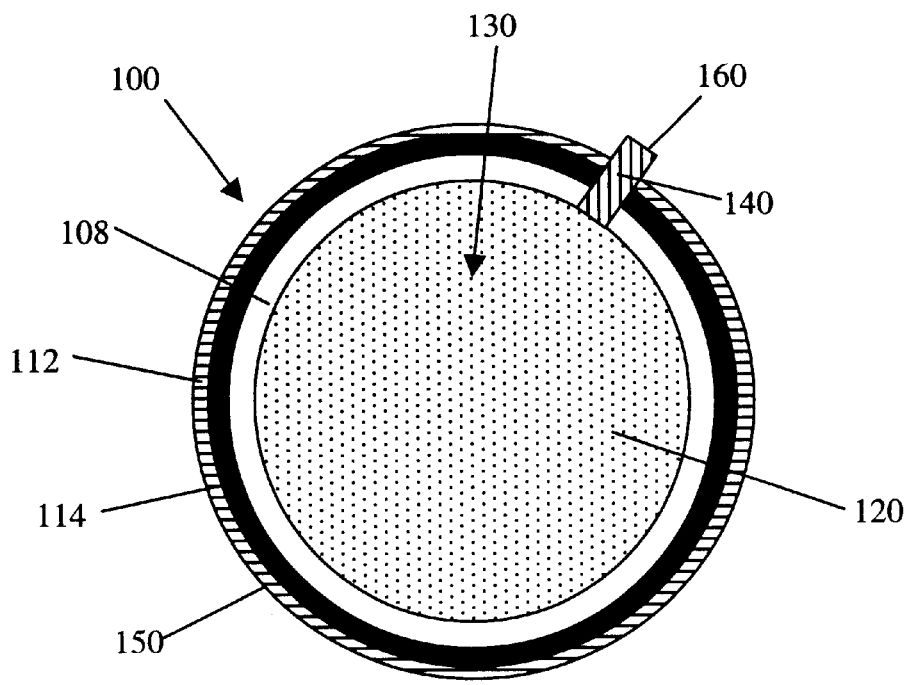
FIG. 3B is a schematic drawing of a hydrogen storage and supply apparatus that has a container with a two wall structure and an intervening cavity.

FIGS. 3A and 3B are schematic drawings showing other embodiments of the invention, wherein the container for a hydrogen storage and supply apparatus has a multiple wall structure. In FIG. 3A, the cold enclosure 120 is surrounded by a first wall 108, and the first wall 108 is surrounded by a second wall 112. In this arrangement, the first wall 108 and the second wall 112 are generally in contact with one another. In FIG. 3B, the cold enclosure 120 is surrounded by a first wall 108, and the first wall 108 is surrounded by a second wall 112. There is an intervening cavity 114 between the two walls 108, 112. The cavity 114 can provide thermal insulation. The thermal insulation can be a high quality vacuum in the cavity 114. Preferably, the vacuum is below $10^{-5}$ torr, more preferably, below $10^{-7}$ torr. The thermal insulation can be an insulating material (not shown), such as aerogel, disposed within the cavity 114. Alternatively, the cavity 114 can contain a thermal radiation reflecting material, such as MLVSI (multi-layer vacuum super insulation).

FIGS. 3A and 3B each show containers having two walls, but any number of walls can be used. The skilled artisan will understand that there are many possible arrangements of walls, cavities, vacuum, and insulating material, which may be desirable for the container structure and that fall within the scope of the embodiments of this invention. The walls 108, 112, and others (not shown) can be made all of the same material, or different materials can be used for different walls. In one arrangement, the first wall 108 is a metal, and the second wall 112 is a high strength plastic that is thermally insulating.

The containers illustrated in FIGS. 3A and 3B each have a port 140 as was shown for the illustrated embodiment in FIG. 2. As was discussed for FIG. 2, the containers can have one or more ports 140, which provide channels for hydrogen flow into and out of the cold enclosure 120. The ports 140 can include valves (not shown) to control the hydrogen flow. For example, a first port 140 can be used to provide hydrogen to the cold enclosure 120, and a second port 140' (not shown) can be used to withdraw hydrogen from the cold enclosure 120. The distal end 160 of the port 140 can be flush with the exterior surface 150 of the container, or the distal end 160 can be recessed with respect to the exterior surface 150, as long as the arrangement provides a channel for hydrogen flow into and out of the cold enclosure 120. The distal end 160 of the port can engage with fittings on outside elements (not shown). Outside elements can provide hydrogen to the cold enclosure 120 or withdraw hydrogen from the cold enclosure 120 through the one or more ports 140.

Figure 4:
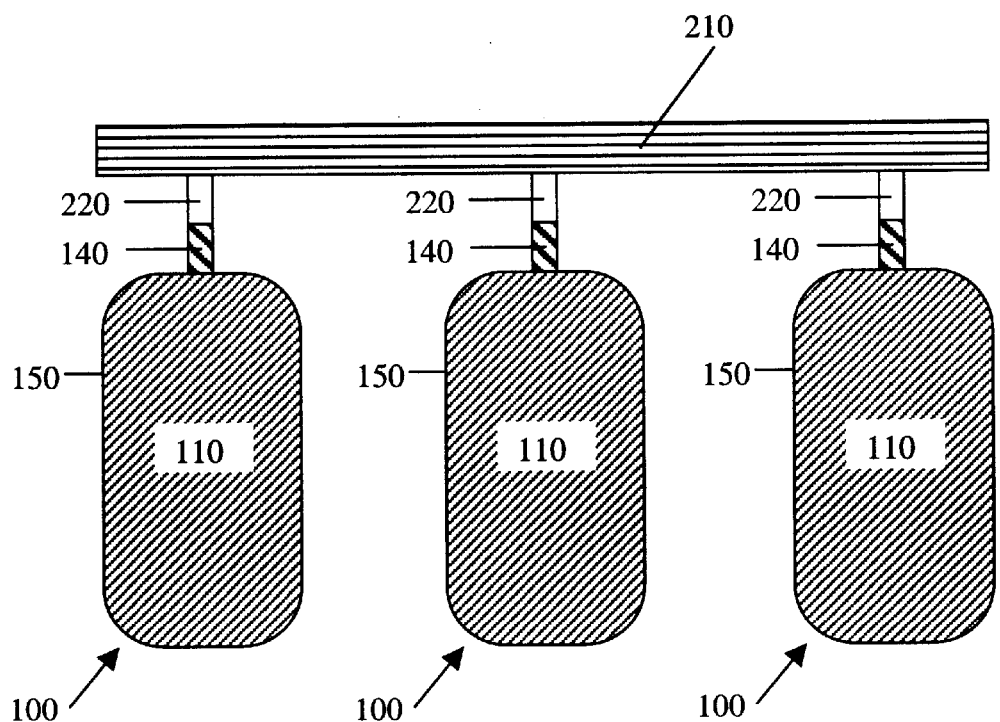
FIG. 4 is a schematic drawing of an interconnected plurality of hydrogen storage and supply apparatuses, according to an embodiment of the invention.

FIG. 4 shows schematically an arrangement for an interconnected plurality of hydrogen storage and supply apparatuses according to an embodiment of the invention. In FIG. 4, three hydrogen storage and supply apparatuses 100 are shown connected to a coupling assembly 210. In other arrangements, any number of hydrogen storage and supply apparatuses 100 can be used. As discussed above in reference to FIGS. 2, 3A, and 3B, each hydrogen storage and supply apparatus container 110 has at least one port 140. The one or more ports 140 provide channels for hydrogen flow into and out of the cold enclosure (not shown). The ports 140 can include valves (not shown) to control the hydrogen flow. As shown in FIG. 4, the ports 140 can attach to fittings 220 on the coupling assembly 210 to allow flow of hydrogen into and out of the containers 110 through the coupling assembly 210. The fittings 220 on the coupling assembly 210 can protrude as shown, they can be flush with the coupling assembly 210, or they can be recessed into the coupling assembly 210. The fittings 220 can contain valves to allow access to each port 140 for separate opening or closing. The coupling assembly 210 can be coupled to a hydrogen-consuming device (not shown) and thereby supply hydrogen to the device from a number of hydrogen storage and supply apparatuses 100. The coupling assembly 210 can be coupled to a hydrogen source (not shown) and thereby provide hydrogen to any number of attached hydrogen storage and supply apparatuses 100.

Figure 5A:
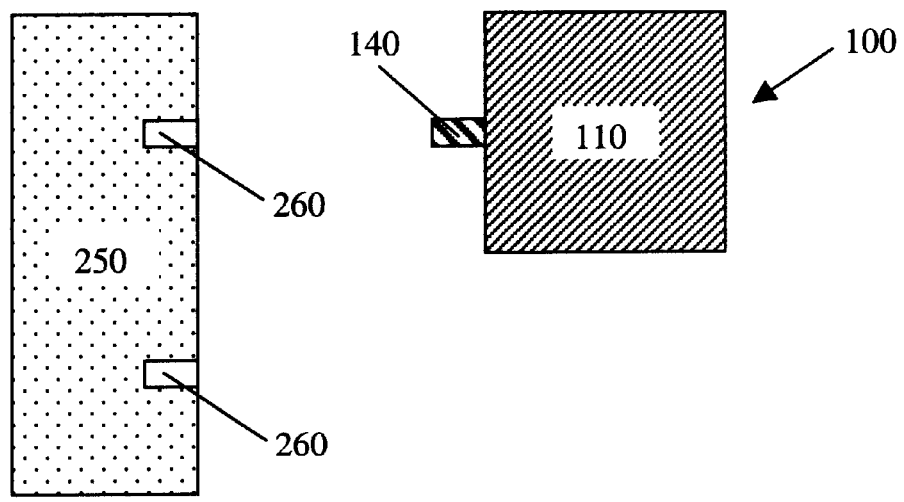
FIG. 5A is a schematic drawing of components of a hydrogen-consuming system, according to an illustrated embodiment of the invention.
Figure 5B:
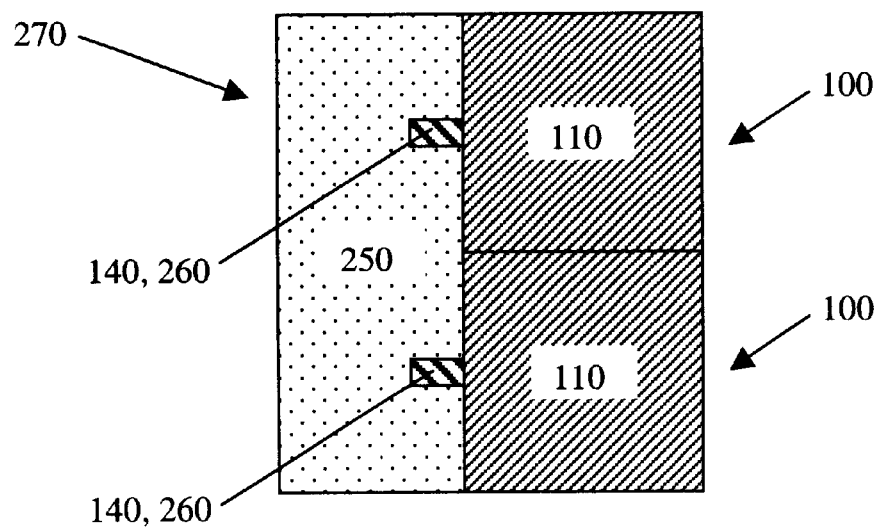
FIG. 5B is a schematic drawing of a hydrogen-consuming system, according to an illustrated embodiment of the invention.

FIGS. 5A and 5B are schematic drawings of a hydrogen-consuming system, according to an illustrated embodiment of the invention. In FIG. 5A, a hydrogen-fueled device 250 is shown. The hydrogen-fueled device 250 can contain a fuel cell that uses hydrogen fuel to make electricity. The hydrogen-fueled device 250 is any device that can be powered using hydrogen fuel. Examples of hydrogen-fueled devices include transportation vehicles, including land, water, and air vehicles, household appliances, power tools, electronic devices, such as laptop computers or cell phones, and machines. Land vehicles include, but are not limited to, automobiles, trucks, and motorcycles. Water vehicles include, but are not limited to, motorboats, ships, and personal water transport devices. The hydrogen-fueled device 250 in FIG. 5A includes fittings 260 that can connect to a port 140 on any of a plurality of interchangeable hydrogen storage and supply apparatuses 100. There can be valves (not shown) within the fittings 260 or within the ports 140. Any number of fittings 260 capable of connecting to any number of ports 140 is possible. As has been described above with reference to FIGS. 2, 3A and 3B, the hydrogen storage and supply apparatus 100 includes a container 110, a cold enclosure (not shown) that contains a porous material (not shown) which is made of one or more light elements (Be, B, C, N, O, F, Mg, P, S, Li, Na, Al, Si and Cl) and which can occlude hydrogen.

In FIG. 5B, a hydrogen-consuming system 270 is shown. The hydrogen-fueled device 250 is connected to ports 140 on containers 110 through fittings 260 and thereby receives hydrogen from the cold enclosure (not shown) inside the hydrogen storage and supply apparatuses 100. The illustrated embodiment in FIG. 5B shows a hydrogen-fueled device 250 that is connected to two hydrogen storage and supply apparatuses 100. The hydrogen-fueled device 250 can be configured to connect to any number, from one to thousands or more, of hydrogen storage and supply apparatuses 100. In other arrangements, the hydrogen storage and supply apparatuses 100 can be connected to a coupling device (not shown), and the coupling device can be connected to the hydrogen-fueled device 250. A coupling device as has been described above with reference to FIG. 4 can be used. Let it be understood that the hydrogen storage and supply apparatuses 100 in this embodiment can be interchangeable with one another. When it is desirable to remove a hydrogen storage and supply apparatus 100 from service for any reason, such as becoming low on fuel, it can be disconnected from the hydrogen-fueled device 250, and another hydrogen storage and supply apparatus 100, such as one that contains hydrogen, can be connected to the hydrogen-fueled device 250 in place of the removed hydrogen storage and supply apparatus 100. The ability to interchange hydrogen storage and supply apparatuses 100 ensures that the hydrogen-fueled device 250 can operate continuously without downtime for reasons such as refueling or failure of a hydrogen storage and supply apparatus 100. Individual hydrogen storage and supply apparatuses 100 can be fueled with hydrogen and be standing by to replace hydrogen storage and supply apparatuses 100 as they are disconnected and removed from the hydrogen-fueled device 250.

Figure 6:
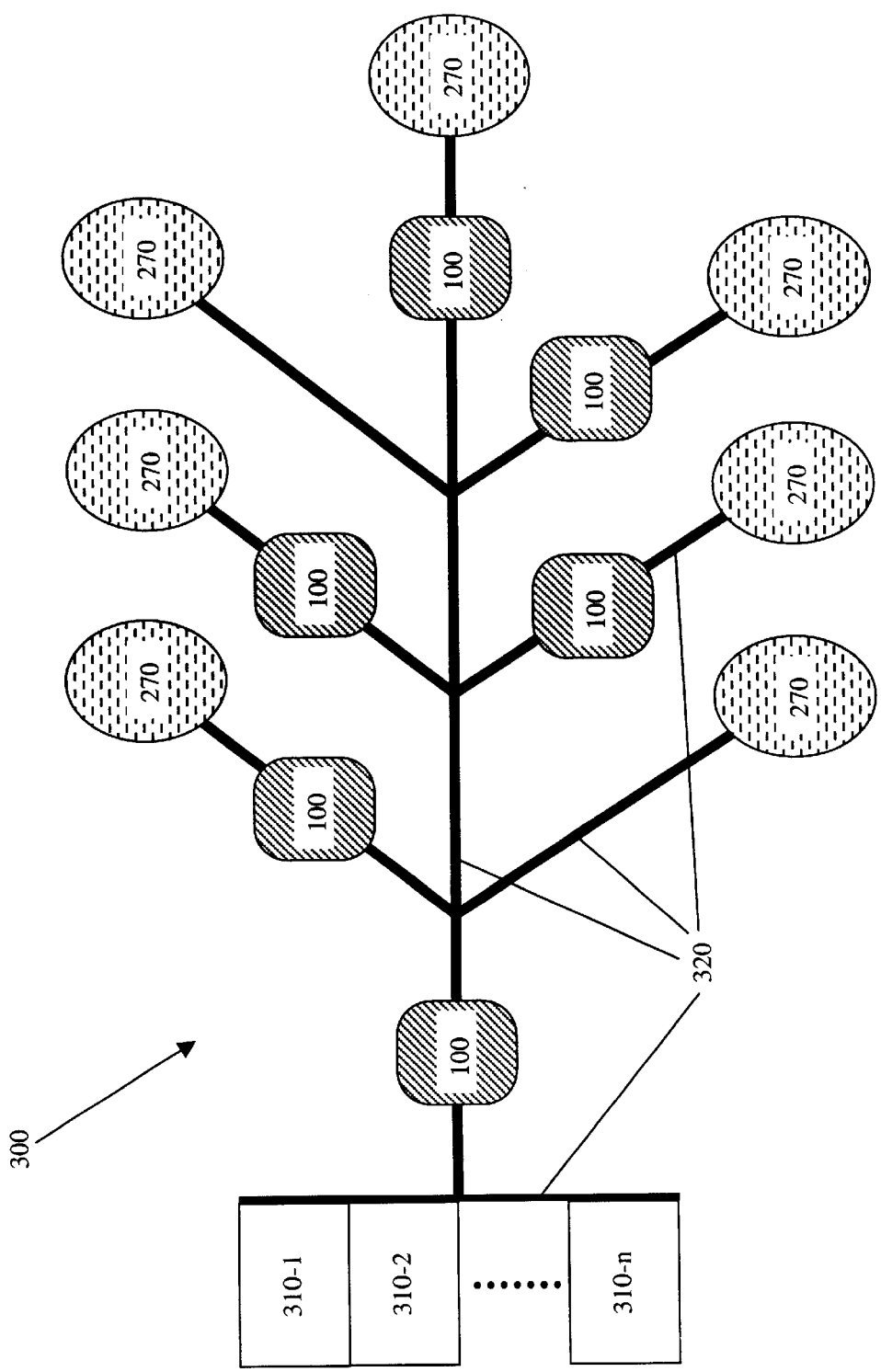
FIG. 6 is a schematic drawing illustrating a hydrogen production and distribution system, according to an embodiment of the invention.

FIG. 6 is a schematic drawing illustrating a hydrogen production and distribution system 300 according to an embodiment of the invention. One or more hydrogen production facilities 310-1, 310-2, . . . , 310-n are shown. The hydrogen production facilities 310-1, 310-2, . . . , 310-n can be very large industrial facilities, very small micro-generation units, facilities of medium size, or any combination thereof. Hydrogen can be produced by electrolysis of water, by reforming or cracking of natural gas, or by any other method known in the art. The hydrogen distribution system 320 can receive hydrogen from the hydrogen production facilities 310-1, 310-2, . . . , 310-n and can distribute the hydrogen to hydrogen-consuming systems 270 or to hydrogen storage and supply apparatuses 100. The hydrogen distribution system 320 can range in complexity from a simple conduit that transfers hydrogen from a micro-generation unit to a hydrogen-fueled device to a complex system involving tank trucks and tank rail cars, which move hydrogen from numerous hydrogen production facilities 310-1, 310-2, . . . , 310-n to a vast number of storage facilities 100 and hydrogen-consuming systems 270. Hydrogen storage and supply apparatuses 100, such as described above in reference to FIGS. 2, 3A, and 3B, can be included within the hydrogen production facilities, within the distribution system, for example, on tank trucks and tank rail cars, and within the hydrogen-consuming systems 270. Hydrogen storage and supply apparatuses 100 can be used anywhere in the hydrogen production and distribution system 300 to store hydrogen for any length of time. Any number of hydrogen storage and supply apparatuses 100 and hydrogen-consuming systems 270 can be included in the hydrogen production and distribution system 300.

Figure 7:
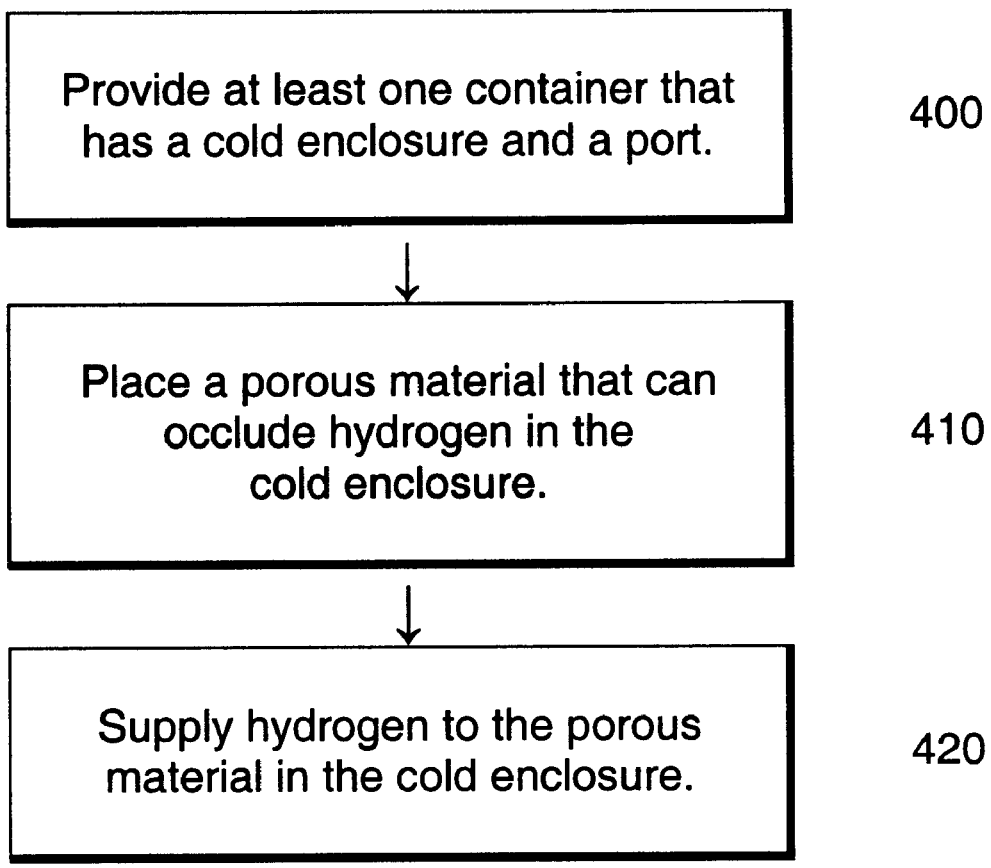
FIG. 7 is a flow chart that outlines a method for storing hydrogen, according to an embodiment of the invention.

A method for storing hydrogen according to an embodiment of the invention can be described with reference to the flow chart in FIG. 7. In the first step 400, at least one container is provided, which has a cold enclosure and a port. In the second step 410, a porous material that can occlude, i.e., adsorb or absorb hydrogen is placed in the cold enclosure. In the third step 420, hydrogen is supplied to the porous material in the cold enclosure. The temperature in the cold enclosure is between about 30K and 270K, preferably between about 100K and 220K, more preferably, in the range from about 150K to about 220K. The pressure in the cold enclosure is between about 2 bara and 50 bara. A coupling assembly can be engaged with at least one port on each of a plurality of the containers. Hydrogen can be provided to any number of the containers through the coupling assembly.

Figure 8:
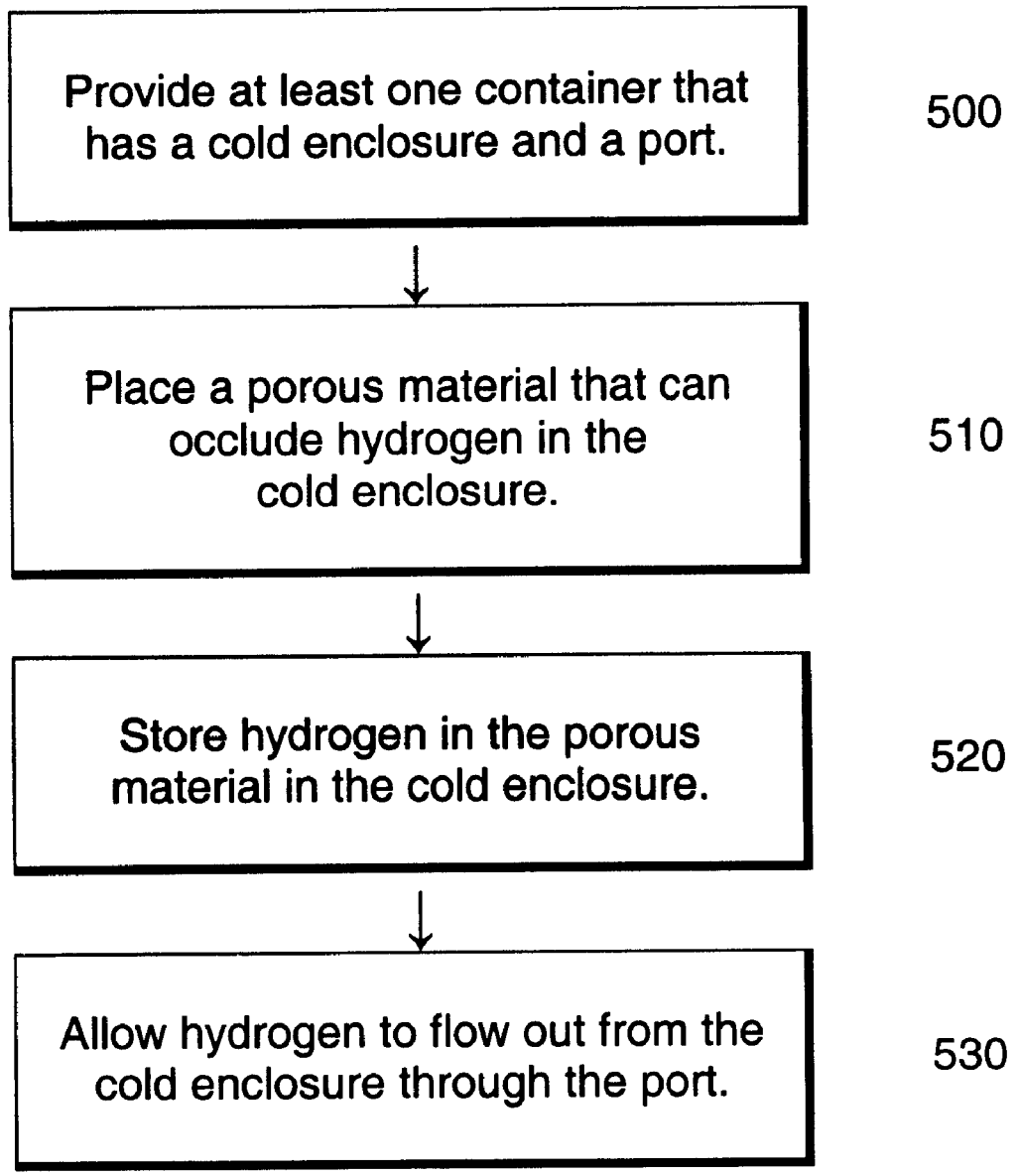
FIG. 8 is a flow chart that outlines a method for supplying hydrogen, according to an embodiment of the invention.

A method for supplying hydrogen according to an embodiment of the invention can be described with reference to the flow chart in FIG. 8. In the first step 500, at least one container is provided, which has a cold enclosure and a port. In the second step 510, a porous material that can occlude, i.e., adsorb or absorb hydrogen is placed in the cold enclosure. In the third step 520, hydrogen is stored in the porous material in the cold enclosure. The temperature in the cold enclosure is between about 30K and 270K, preferably between about 100K and 120K more preferably, in the range from about 150K to about 220K. The pressure in the cold enclosure is between about 2 bara and 50 bara. In the fourth step 530, hydrogen is allowed to flow out from the cold enclosure through the port. An element to which the hydrogen is to be supplied can be attached to the port A coupling assembly can be engaged with at least one port on each of any number of the containers. Hydrogen can flow out from any number of the containers through the coupling assembly to the target element.

Figure 9:
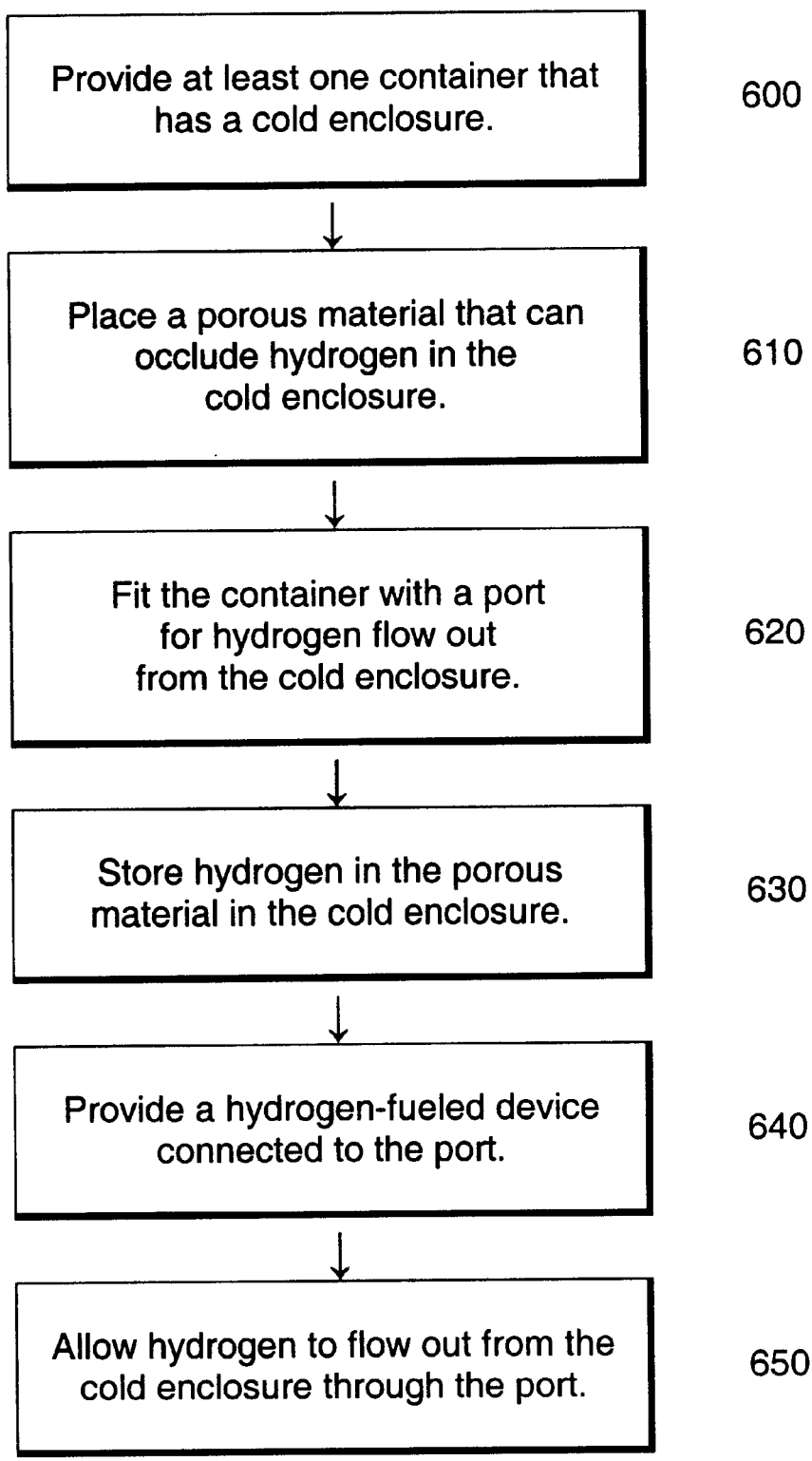
FIG. 9 is a flow chart that outlines a method for using hydrogen as a fuel, according to an embodiment of the invention.

A method for using hydrogen as a fuel according to an embodiment of the invention can be described with reference to the flow chart in FIG. 9. In the first step 600, at least one container is provided, which has a cold enclosure. In the second step 610, a porous material that can occlude, i.e., adsorb or absorb hydrogen is placed in the cold enclosure. In the third step 620, the container is fitted with a port through which hydrogen can flow out of the cold enclosure. In the fourth step 630, hydrogen is stored in the porous material in the cold enclosure. The temperature in the cold enclosure is between about 30K and 270K, preferably between about 100K and 220K, more preferably, in the range from about 150K to about 220K. The pressure in the cold enclosure is between about 2 bara and 50 bara. In the fifth step 640, a hydrogen-fueled device is connected to the port. In the sixth step 650, h is connected to the port. In the sixth step 650, hydrogen is allowed to flow out from the cold enclosure through the port.

This invention has been described herein in considerable detail to provide those skilled in the art with information relevant to apply the novel principles as is required. However, it is to be understood that the invention can be carried out by different equipment, materials and devices, and that various modifications, both as to the equipment and operating procedures, can be accomplished without departing from the scope of the invention itself, which is defined by the appended Claims.

We claim:

1. A hydrogen storage and supply apparatus, comprising:
   a container having a cold enclosure;
   a porous material capable of occluding hydrogen, the porous material pervading the cold enclosure, wherein the porous material comprises a plurality of light elements selected from the group consisting of Be, B, C, N, O, F, Mg, P, S, Li, Na, Al, Si and Cl;
   the container having a layered wall structure having at least two walls, a first wall and a second wall, the first wall surrounding the cold enclosure and the second wall surrounding the first wall;
   wherein the first wall and a second wall define a cavity therebetween and
   the cavity provides thermal insulation.

2. The apparatus of claim 1, wherein the thermal insulation comprises a high quality vacuum.

3. The apparatus of claim 1, wherein the thermal insulation comprises an insulating material disposed in the cavity.

4. A hydrogen storage and supply apparatus, comprising:
   a container having a cold enclosure;
   a porous material capable of occluding hydrogen, the porous material pervading the cold enclosure, wherein the porous material comprises a plurality of light elements selected from the group consisting of Be, B, C, N, O, F, Mg, P, S, Li, Na, Al, Si and Cl, wherein the porous material comprises at least 2 light elements selected from the group consisting of Be, B, C, N, O, F, Mg, P, S, Li, Na, Al, Si, and Cl, and each of two light elements comprises at least 10 weight % of the porous material.

5. The apparatus of claim 4, wherein each of two light elements comprises at least 15 weight % of the porous material.

6. The apparatus of claim 4, wherein each of two light elements comprises at least 20 weight % of the porous material.

7. A method for using hydrogen as fuel, comprising the steps of:
   providing at least one container having a cold enclosure;
   placing in the cold enclosure a porous material capable of occluding hydrogen,
   wherein the porous material comprises at least 2 light elements selected from the group consisting of Be, B, C, N, O, F, Mg, P, S, Li, Na, Al, Si, and Cl, and each of two light elements comprises at least 10 weight % of the porous material;
   providing a channel for hydrogen flow out from and into the cold enclosure by fitting at least one container with at least one port;
   storing hydrogen in the porous material in the cold enclosure;
   providing a hydrogen-fueled device, the device connected to at least one port on at least one container; and
   allowing hydrogen to flow out from the cold enclosure to the hydrogen-fueled device through at least one port.

8. The method of claim 7, wherein each of two light elements comprises at least 15 weight % of the porous material.

9. The method of claim 7, wherein each of two light elements comprises at least 20 weight % of the porous material apparatus.

* * * * *

UNITED STATES PATENT AND TRADEMARK OFFICE
CERTIFICATE OF CORRECTION

PATENT NO. : 6,748,748 B2  
APPLICATION NO. : 10/167946  
DATED : June 15, 2004  
INVENTOR(S) : Bradley et al.

It is certified that error appears in the above-identified patent and that said Letters Patent is hereby corrected as shown below:

Column 1, line 28, please replace "neet" with --need--.

Column 2, line 37, please replace "bara" with --bar--.

Column 2, line 38, please replace "2 bara" with --2 bar--.

Column 4, line 40, please replace "bara" with --bar--.

Column 4, line 42, please replace "50 bara" with --50 bar-- and "2 bara" with --2 bar--

Column 4, line 43, please replace "bara" with --bar--.

Column 4, line 64, please replace "bara" with --bar--.

Column 4, line 65, please replace "2 bara" with --2 bar-- and "20 bara" with --20 bar--.

Column 8, line 32, please replace "2 bara" with --2 bar-- and "50 bara" with --50 bar--.

Column 8, line 46, please replace "120K" with --220K--.

Column 8, line 48, please replace "2 bara" with --2 bar-- and "50 bara" with --50 bar--.

Column 9, line 2, please replace "2 bara" with --2 bar-- and "50 bara" with --50 bar--.

Signed and Sealed this

Twenty-second Day of May, 2007

JON W. DUDAS  
*Director of the United States Patent and Trademark Office*